Figure 1:
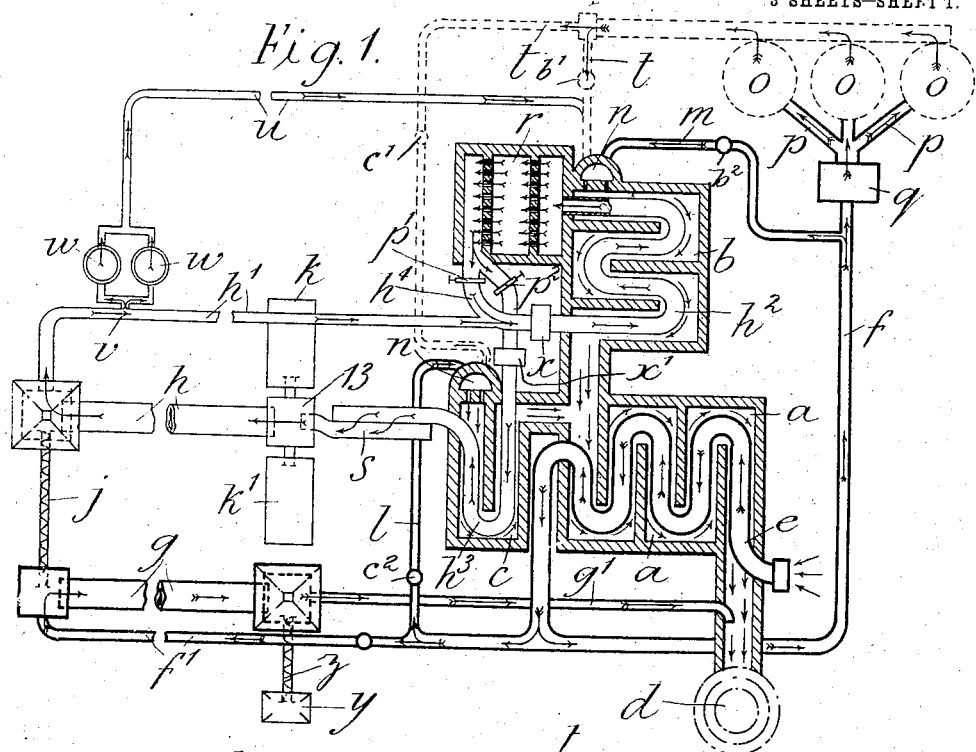

A. E. BOURCOUD.
MEANS OR APPARATUS IN OR RELATING TO THE MANUFACTURE OF IRON AND OTHER METALS.
APPLICATION FILED DEC. 15, 1911.

1,086,134.

Patented Feb. 3, 1914.

3 SHEETS—SHEET 1.

Witnesses
Rosina F. Finotti
W. Wallace Nairn Jr.

Inventor
Augustin Emilis Bourcoud
By
Julian C. Dowell
Attorney

A. E. BOURCOUD.
MEANS OR APPARATUS IN OR RELATING TO THE MANUFACTURE OF IRON AND OTHER METALS.
APPLICATION FILED DEC. 15, 1911.

1,086,134.

Patented Feb. 3, 1914.

3 SHEETS—SHEET 2.

A. E. BOURCOUD.
MEANS OR APPARATUS IN OR RELATING TO THE MANUFACTURE OF IRON AND OTHER METALS.
APPLICATION FILED DEC. 15, 1911.
1,086,134. Patented Feb. 3, 1914.
3 SHEETS—SHEET 3.
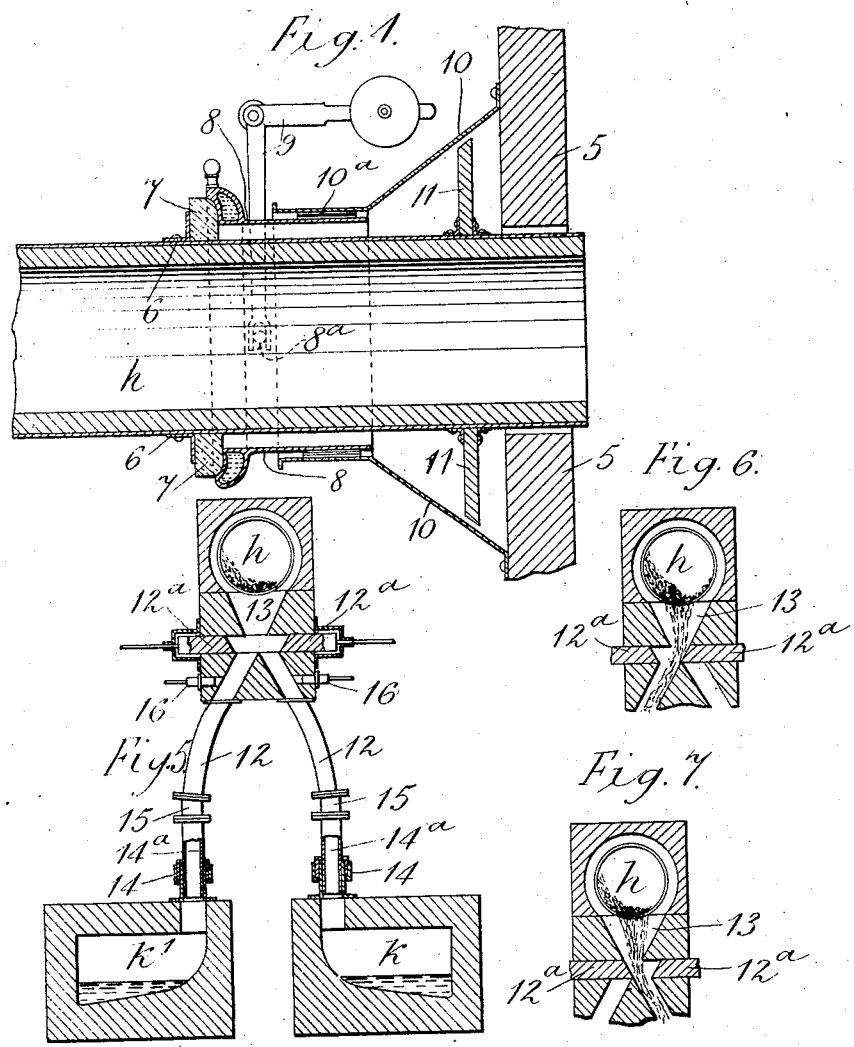

UNITED STATES PATENT OFFICE.

AUGUSTIN EMILIO BOURCOUD, OF LONDON, ENGLAND.

MEANS OR APPARATUS IN OR RELATING TO THE MANUFACTURE OF IRON AND OTHER METALS.

1,086,134. Specification of Letters Patent. Patented Feb. 3, 1914.

Original application filed December 27, 1910, Serial No. 599,467. Divided and this application filed December 15, 1911. Serial No. 665,876.

*To all whom it may concern:*

Be it known that I, AUGUSTIN EMILIO BOURCOUD, a subject of the King of Spain, residing at London, England, have invented Improved Means or Apparatus in or Relating to the Manufacture of Iron and other Metals, of which the following is a specification.

This invention relates to apparatus adapted for carrying out a closed cyclic process of the kind wherein metal is obtained from its ore by gaseous reducing agents, mainly carbonaceous, and resulting carbon dioxid is regenerated for re-use by incandescent carbon, the reduction process and the regenerative process taking place together in a closed cycle, or the regenerative process taking place separately in a closed and independent cycle, or the two processes taking place together in any desired proportionate rate so that the proportion of carbon dioxid mixed with the carbon monoxid constituting the reducing gas can be controlled to suit varying circumstances.

The present invention is a division with same date of priority of application Serial No. 599,467 and relates to means or apparatus suitable for carrying out the process forming the subject of such application.

The invention will be described mainly as applied to iron ores for which it is specially applicable. According thereto, means are provided whereby instead of supplying the charge in comparatively large pieces to a shaft furnace and causing the reducing gas to flow through and among the whole mass of the charge as heretofore proposed, the charge can be supplied in a comminuted or granular condition to and caused to travel slowly and with continuous agitation through the reducing zone of a reducing furnace, for example a rotary furnace, and the current of reducing gas, consisting mainly of carbon monoxid with a controlled amount of carbon dioxid, can be caused to flow over and in contact with the continuously agitated stream of material treated, whereby the charge and the reducing gas are brought into intimate contact and the ore reduced in an effective and comparatively quick manner. One or more melting furnaces, preferably electric, are provided into which the reduced ore with any associated gangue and flux are delivered and wherein they are melted and the metal separated and wherein the metal may, if desired, be further treated to modify its character.

The ore to be treated commonly contains various impurities, for examples compounds of phosphorus, sulfur, arsenic, manganese, chromium and silicon, and moisture and organic matter. The reducing gas also commonly contains hydrogen, or hydrogen yielding substances or water, which, on decomposition, yields hydrogen, and also sulfur dioxid. Of these impurities it has been found that hydrogen in particular causes, whenever present in the circulating gas, serious complications in the metallurgical reactions that cannot be allowed for or foreseen. Again, at temperatures below 750° C. (seven hundred and fifty degrees centigrade), iron ore absorbs almost the whole of any sulfur present in the reducing gas, such sulfur mostly passing into the iron obtained instead of into the lime flux used. When both hydrogen and phosphoric acid are present, they are apt to first combine and afterward decompose, the phosphorus passing into the iron. On the other hand, mixtures of carbon monoxid and carbon dioxid that are free from hydrogen, exert no action on phosphorous compounds, or manganous oxid (MnO), or arseniates, or chromium oxids or silica. Furthermore, reactions between iron ores and pure mixtures of carbon monoxid and dioxid gases, in varying ratio and at different temperatures, and likewise between the said gases and incandescent carbon, can be separately plotted in advance by curves, so that any predetermined and desired result can be attained.

To avoid, as far as possible, the above mentioned disadvantages and to obtain the advantages set forth, moisture, organic matter or volatile impurities present in the charge to be treated are eliminated, as fa. as possible, by means, as a rotary furnace, for so heating the charge with hot air, that it can be delivered in a dry, purified and hot condition to the reduction furnace. Hydrogen can be prevented from entering the reducing gas from the regenerator by feeding the latter with thoroughly dry and hot coke. In this way the reducing gas employed will be rendered free from and will be maintained free from hydrogen and the introduction of volatile impurities from the charge into the gas prevented. Any sulfur in the gas from the fuel can be eliminated, when necessary, before the gas reaches the charge, by a device charged with sulfur extracting material. The reducing gas being free from hydrogen, oxidized foreign bodies in the charge not affected by carbon oxid gases alone, pass off in the slag, thus preventing useless expenditures of chemical energy besides avoiding impurity in the product. Should small quantities of sulfur have escaped elimination from the charge in the preheating furnace, the basic nature of the melting furnace treatment on the mixed spongy metal, flux and gangue will entirely remove such sulfur.

The plant is arranged to economically satisfy the various heat requirements of the described process and so that waste heat from one portion is utilized in another whereby the under-mentioned features, which govern the nature of the results obtained, are under complete control, namely: A. The composition and temperature of the gases and the temperature of the charge entering the reducing furnace. B. The volume of gas passed through the gas circulating conduit and the quantity of ore reduced per unit period; and C. The temperature and composition of the gas leaving the reducing furnace and which determine the treatment of the gas before it is again admitted to the reduction furnace.

Figure 2:
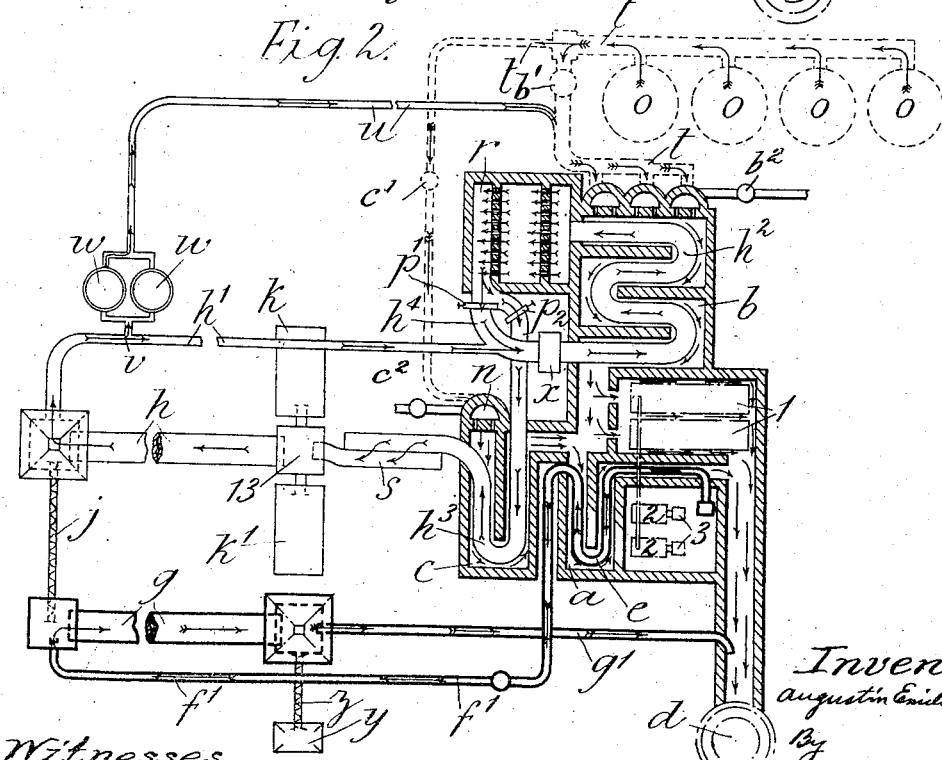
Figure 3:
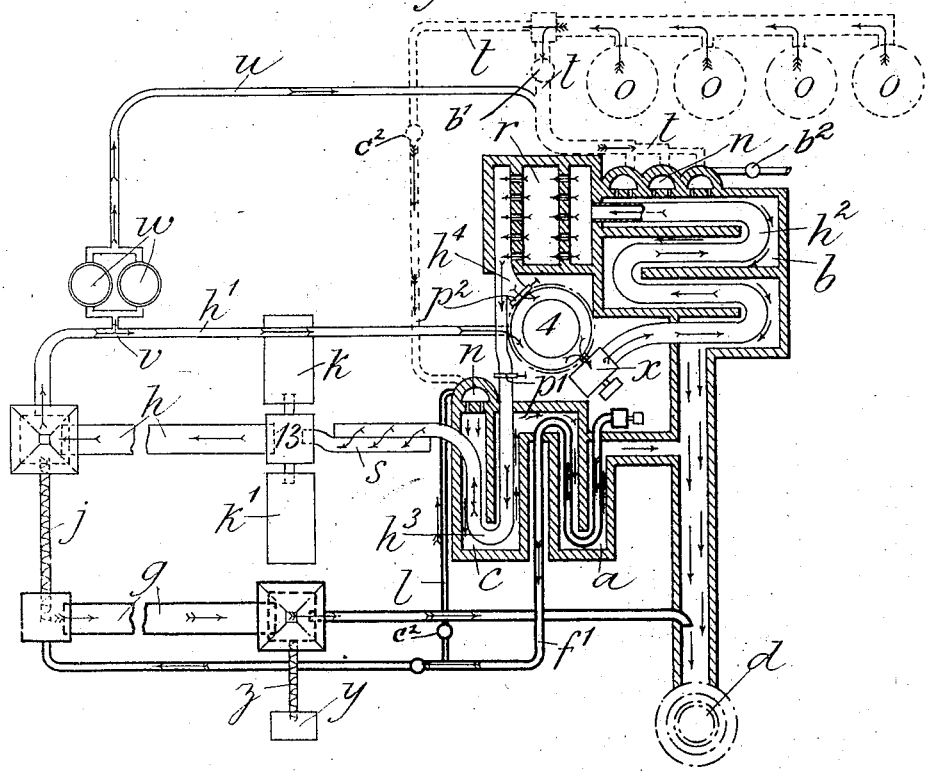

In the drawings Figure 1 shows diagrammatically, in plan, one arrangement according to the invention. Fig 2 shows in plan plant generally similar to that in Fig. 1 but with additional means for raising steam, driving engines 2 and generators 3. Fig. 3 is also a plan view wherein steam raising and utilizing means shown in Fig. 2 are substituted by a steam raising or air heating device. Fig. 4 is a vertical longitudinal section of a gas tight joint suitable for the ends of the rotary furnace. Figs. 5, 6 and 7 are vertical sections showing means for discharging the metal from the rotary reducing furnace and delivering it to the electric melting furnaces.

In Figs. 1, 2 and 3, $h$ and $r$ are respectively a long inclined rotary reducing furnace, and a coke regenerator which, together with pipes $h^1$, $h^2$, $h^3$ form a closed gas circulating conduit.

$b$ and $c$ are principal heating stoves arranged to respectively heat the gases before entering and after leaving the regenerator $r$.

$b^1$ and $b^2$ are valves in the pipes that respectively supply combustible gas and air to the stove $b$ and $c^1$; and $c^2$ are corresponding valves in the gas and air supplies to stove $c$ whereby the supply of gas and air and therefore the temperature of the stoves can each be regulated.

$x$ is a gas circulating pump arranged between the pipes $h^1$ and $h^2$. An additional pump $x^1$ may, if desired be placed between the regenerator $r$ and pipe $h^3$.

$h^4$ is a by-pass pipe with valves $p^1$ whereby the outlet of the regenerator can be connected to the inlet of the gas circulating device $x$.

$p^2$ is a controlling valve in the pipe $h^3$.

$s$ is a purifier forming part of the closed conduit and charged with material, for example lime or equivalent, for removing sulfur from the regenerated gas.

$g$ is an inclined rotary heater for preliminarily heating and purifying the charge.

$a$ is a supplementary stove containing an air heating pipe $e$; $o$ are gas producers, and $k$ $k$; electric furnaces. Combustible gas from the producers $o$ is led by valve controlled pipes $t$ through inlet chambers $n$ to, and burnt in, the stoves $b$ and $c$. The degree of heat attained can be controlled by varying the supply of air and gas to the stoves $b$ and $c$. A hopper $y$ and conveyer $z$ deliver ore and flux to the rotary heater $g$ and a conveyer $j$ delivers the treated charge to the reducing furnace $h$. Singly feathered arrows indicate the path of the reducing gases, doubly feathered ones that of heated air, and triple feathered ones that of gases for combustion.

In Fig. 1, air drawn into the conduit $e$ is heated by products of combustion from the stoves $b$ and $c$, and divided into two main currents. One main current passes along a conduit $f$, part of it passing to the gas producers $o$ after first vaporizing water descending a coke or like tower $q$, the vapor and cooled air entering the producers $o$ through pipes $p$ thereby forming producer gas and water gas and avoiding clinker formation. The remaining portion of the said current of air passes through a valve controlled pipe $m$ and serves to burn producer gas in the stove $b$. The second main air current passes partly through a valve controlled pipe $l$ to burn producer gas in the stove $c$ and the remainder passes to the rotary heater $g$ through a pipe $f^1$ and thence through a pipe $g^1$ to a chimney $d$ or to the gas producers $o$. In the closed reducing gas cycle, hot carbon monoxid, alone or mixed with carbon dioxid, is delivered to the lower end of the rotary reducing furnace $h$ and after use therein is, by the pump $x$ drawn from the furnace and delivered to the gas regenerator $r$. Thence the gas is either wholly delivered to the pipe $h^3$ in the heating stove $c$ and thence to the reducing furnace $h$, or wholly back to the regenerator through the pipe $h^2$, or some of it may be delivered direct to the furnace $h$ and the remainder caused to circulate, as long as required, through the pipes $h^4$, $h^2$ and the regenerator, according to the required degree of regeneration of the carbon monoxid and the relative proportions of it and the carbon dioxid in the gas to be re-delivered to the reducing furnace. By the aid of the valves $p^1$ and $p^2$ such proportions can be fully controlled. Surplus gas, due to the reconversion of carbon dioxid into carbon monoxid, is removed at $v$ through gas holders $w$ and delivered through a pipe $u$ and utilized to supplement the combustible gases from the producers $o$.

In Fig. 2, the stove $a$ serves to heat air for preliminarily heating and purifying the charge only, the producers $o$ and principal heating stoves $b$ and $c$ receiving their air supply, heated or not, from some other source. Combustible gas in excess can be burnt in the principal stoves $b$, $c$ and some of the products of combustion can, as shown in Fig. 2, be utilized to raise steam in boilers 1 for generating electricity for the electric furnaces, such steam being used for example in turbines 2 driving dynamos 3.

Fig. 3 resembles Fig. 2 except that hot gas passing from the regenerator $r$ through pipe $h^4$ to pipe $h^2$ in stove $b$ is caused to raise steam in a boiler 4, or to heat air, which can be utilized as required, and the stove $c$ is supplied with air from pipe $f^1$. Iron differs in allotropic condition according to the temperature employed in its reduction, and it is important to be able to obtain it in any one of such conditions, a result readily attainable by the present process. When the desired allotropic condition corresponds with a low temperature treatment, the second heating stove $c$ can be sometimes dispensed with, or not used.

Fig. 4 illustrates one of the gas tight joints between the ends of the rotary reducing furnace $h$ and the stationary parts through which it passes. The furnace is provided with a flange 6 carrying a packing ring 7 of graphitic asbestos, for example, against which an endwise movable sleeve 8 is pressed by a weighted bell crank lever 9 engaging a pin $8^a$ on the sleeve. A housing 10 fixed to the wall 5 embraces the sleeve 8, a packing ring $10^a$ being arranged between the sleeve and housing, which are preferably protected from heat by a ring 11. The outer end of the sleeve 8 may, as shown, be water jacketed and provided with a lubricator. The housing 10 can also be jacketed.

Fig. 5 shows means for controlling the connection between the electric furnaces $k$, $k^1$ and reducing furnace $h$. Each furnace $k$, $k^1$ is connected by a pipe $14^a$ to a branch 12 leading from the discharge chamber 13 of the furnace $h$, such pipe being also connected, by a gas tight joint 14 to the corresponding electric furnace. Each electric furnace can, for convenience of discharging, be arranged to tilt. A detachable wedge shaped pipe 15 connects, in gas tight manner, adjacent ends of each pipe $14^a$ and branch 12, each branch having a valve 16 for placing it out of connection with the discharge chamber 13 for effecting repairs or any other purpose. $12^a$ are slide valves of refractory material whereby the reduced charge can be directed to any electric furnace, of which there may be any desired number. Two or more rotary reducing furnaces $h$ may be used and discharged into a common discharge chamber such as 13.

The operation of the apparatus, as illustrated in Fig. 1 and Figs. 4, 5, 6 and 7 is as follows:—Combustible gas generated in the producers $o$ is burnt, with the aid of air, at the stove inlets $n$ and after strongly heating the stoves the products of combustion are discharged into the chimney $d$. Air entering the inlet of the pipe or conduit $e$ is strongly heated in the stove $a$ and then divided into three currents one of which is used to supply the necessary air for the producers $o$, before delivery to which it is caused to evaporate water trickling down the tower $q$ and then to pass, mingled with such vapor, to the said producers. Another of the currents supplies the air necessary for the combustion at $n$, $n$ in the stoves of the gas from the producers $o$, $o$. The third current is delivered to the lower end of the inclined rotary heater $g$ and after passing therethrough discharged into the chimney. Such rotary heater is charged from the other end with the crude ore or crude ore and flux, which while passing therethrough in opposite direction to the air current frees such charge from moisture, organic matter and oxidizable material. The heated gases employed for reducing the ore are at high temperature and leave the reducing furnace cooled in proportion to the chemical work effected and richer in carbon dioxid but poorer in carbon monoxid. Any surplus gas having been withdrawn from circulation through the device 10, the gases are again highly heated to enable them to effect the endothermic reaction $CO_2 = C + 2CO$ in the regenerator through which they are then passed. Since a single circulation may prove insufficient for the necessary carbon monoxid regeneration the gases can be wholly or partly re-circulated through the heating stove $b$ and regenerator. The sufficiently regenerated gas is then re-heated in stove $e$, deprived of sulfur from the coke in the device $s$ and again delivered to the reducing furnace and so on. It is to be observed concerning the preliminary treatment of the charge for reduction that since neither the air nor the gaseous products of its action can pass to the closed reducing cycle, it cannot render the gas in the reducing cycle impure, a most important feature. For effecting the reduction such charge, when preliminarily treated and while still hot, is delivered to the inclined rotary furnace $h$ of the aforesaid reducing cycle, and passes therethrough, oppositely to the reducing gases whereby the iron is wholly reduced and discharged at 13 (as shown in Figs. 5 and 6) into and down the branch pipe 12 leading to the electric furnace $k^1$. After such furnace is charged the right-hand valve $12^a$ can be opened and the left-hand similar valve closed when the reduced charge will pass to the furnace $k$. Either furnace, when charged for instance, can be disconnected by closing the valve $12^a$ corresponding to the branch 12 of the particular furnace and afterward removing the corresponding short wedge shaped pipe 15 and pipe $14^a$. In Fig. 7 the reduction furnace is in communication with electric furnace $k$. The reducing gas should be prevented from circulating through the electric furnace or furnaces since its action is injurious, consequently the element of treating the mass, so as to protect it from the reducing gas, constitutes a material portion of the complete process. The reduced metal when melted will consist of pure or practically pure iron and can be removed as such or treated with other substance for conversion into steel or any special alloy.

What I claim is:—

1. Plant for reducing metal from its ore, comprising a furnace through which the charge to be treated can be passed and simultaneously agitated during treatment therein, a gas regenerator and pipes connecting said furnace and regenerator to form a closed gas-conduit, gas circulating means in said conduit, means for reheating gas passing through said conduit prior to its passing through said regenerator, and means for reheating said gas after leaving said regenerator and before reëntering the reduction furnace.

2. Plant for reducing metal from its ore, comprising, in combination, a reduction furnace, a furnace through which the charge to be treated can be passed and simultaneously agitated during treatment therein, a gas regenerator, and pipes connecting said furnace and regenerator to form a closed gas circuit, a gas circulating device in said conduit, a by-pass between the regenerator outlet and the inlet to the gas circulating device, controlling means whereby gas that has passed through the furnace and regenerator can be caused, at will, to flow direct to the reduction furnace, or back to the regenerator or simultaneously to the reduction furnace and back to the regenerator in controllable proportions, a heating stove for heating a portion of the gas conduit at the inlet side of the regenerator, a heating stove for heating the gas conduit between the regenerator and the reduction furnace, and means for regulating the heating effect of each stove.

3. Plant for reducing metal from its ore, comprising, in combination, a rotary reduction furnace, a gas regenerator, and pipes connecting said furnace and regenerator to form a closed gas conduit, a gas circulating device in said conduit, a by-pass between the regenerator outlet and the inlet to the gas circulating device, controlling means whereby gas that has passed through the furnace and regenerator can be caused, at will, to flow direct to the reduction furnace, or back to the regenerator, or simultaneously to the reduction furnace and back to the regenerator in controllable proportions, a heating stove for heating a portion of the gas conduit at the inlet side of the regenerator, a heating stove for heating a portion of the gas conduit between the gas regenerator and reduction furnace, means for separately regulating the heating effect of each stove and means for delivering excess of gas from said conduit to one of said stoves.

4. Apparatus for reducing metal from its ores comprising in series arrangement an oxidizing chamber adapted to be heated internally by pure hot air and a reducing chamber, means for delivering oxidized ore from said oxidizing chamber to said reducing chamber while preventing mingling of the gases of the oxidizing chamber with gases of the reducing chamber, cyclic reducing means closed against air admission comprising said reducing chamber, a regenerator, a gas circulator; means connecting the outlet of said reducing chamber with the inlet of the regenerator means connecting the outlet of the regenerator with the inlet of the reducing chamber, and means for heating the circulating gases after leaving the reducing chamber and before redelivery to same.

5. Apparatus for reducing metal from its ores comprising in series arrangement an oxidizing chamber adapted to be heated internally by pure hot air, and a reducing chamber, means for agitating the charge while passing through said chambers means for delivering oxidized ore from said oxidizing chamber to said reducing chamber while preventing mingling of the gases of the oxidizing chamber with gases of the reducing chamber, cyclic reducing means closed against air admission comprising said reducing chamber, a regenerator, a gas circulator; means connecting the outlet of said reducing chamber with the inlet of the regenerator, means connecting the outlet of the regenerator with the inlet of the reducing chamber, and means for heating the circulating gases after leaving the reducing chamber and before redelivery to same.

6. Apparatus for reducing metal from its ores comprising in series arrangement an oxidizing chamber adapted to be heated internally by pure hot air, and a reducing chamber, means for agitating the charge while passing through said chambers, means for delivering oxidized ore from said oxidizing chamber to said reducing chamber while preventing mingling of the gases of the oxidizing chamber with gases of the reducing chamber, cyclic reducing means closed against air admission comprising said reducing chamber, a regenerator, a gas circulator; means connecting the outlet of said reducing chamber with the inlet of the regenerator, means connecting the outlet of the regenerator with the inlet of the reducing chamber and means located in advance of the regenerator for heating the circulating gases during their passage from the reducing chamber to the regenerator.

7. Apparatus for reducing metal from its ores comprising in series arrangement an oxidizing chamber adapted to be heated internally by pure hot air and a reducing chamber means for agitating the charge while passing through said chambers means for delivering oxidized ore from said oxidizing chamber to said reducing chamber while preventing mingling of the gases of the oxidizing chamber with gases of the reducing chamber, cyclic reducing means closed against air admission comprising said reducing chamber, a regenerator, a gas circulator; means connecting the outlet of said reducing chamber with the inlet of the regenerator means connecting the outlet of the regenerator with the inlet of the reducing chamber, means for heating the gases leaving the reducing chamber and before delivering same to the regenerator and means for again heating the gases after leaving the regenerator and before being redelivered to the reducing chamber.

8. Plant for reducing metal from its ore, comprising a rotary reduction furnace, a gas regenerator, pipes connecting said furnace and gas regenerator to form a closed conduit, gas circulating means in said conduit, stoves for heating portions of said conduit, a heater into which the charge is fed, a supplementary stove heated by products of combustion from the first mentioned stoves, an air conduit in said supplementary stove, means for supplying heated air from said air conduit to said heater and means for supplying the dried and purified charge from said heater to said reduction furnace.

9. Plant for reducing metal from its ore, comprising a rotary reduction furnace, a gas regenerator, pipes connecting said furnace and gas regenerator to form a closed conduit, gas circulating means in said conduit, stoves for heating portions of said conduit, a heater into which the charge is fed, a supplementary stove heated by products of combustion from the first mentioned stoves, an air conduit in said supplementary stove, means for supplying heated air from said air conduit to said heating stoves, gas producers for delivering gas to the first mentioned stoves, a tower connected to the inlet of said gas producers and through which water is caused to descend and means for delivering heated air from said air conduit to said tower.

10. Plant for reducing metal from its ore, comprising a reduction furnace, a gas regenerator, pipes connecting the said furnace and gas regenerator to form a closed conduit, a gas circulating device in said conduit, a stove for heating a portion of the conduit between the gas circulating device and gas regenerator, and sulfur absorbing means in said conduit and external to said regenerator.

11. Plant for reducing metal from its ore, comprising a reduction furnace, a gas regenerator, pipes connecting the said furnace and gas regenerator to form a closed conduit; a gas circulating device in said conduit, a stove for heating a portion of the conduit between the reduction furnace and the regenerator; a melting furnace into which the reduced metal, gangue and flux can be discharged and means for preventing gas circulating in the conduit from circulating through said melting furnace.

12. Plant for reducing metal from its ore, comprising a rotary reduction furnace, a gas regenerator, pipes connecting said furnace and gas regenerator to form a closed conduit, a gas circulating device in said conduit, a chamber into which said furnace delivers reduced metal, gangue and flux, a melting furnace and a valve controlled discharge passage between said chamber and furnace and through which reduced metal, gangue and flux can be delivered into said melting furnace.

13. Plant for reducing metal from its ore, comprising a rotary reduction furnace, a gas regenerator, pipes connecting said furnace and gas regenerator to form a closed conduit, a gas circulating device in said conduit, a chamber into which said furnace delivers reduced metal, gangue and flux, a plurality of melting furnaces, a plurality of passages between said chamber and melting furnaces and valves for separately controlling said passages.

Signed at London, England, this 4th day of December 1911.

AUGUSTIN EMILIO BOURCOUD.

Witnesses:
HERBERT D. JAMESON,
O. J. WORTH.